(12) United States Patent
Larsson

(10) Patent No.: US 9,657,828 B2
(45) Date of Patent: May 23, 2017

(54) DRIVELINE COMPONENT HAVING DIFFERENTIAL AND PARK LOCK MECHANISM

(71) Applicant: e-AAM Driveline Systems AB, Trollhättan (SE)

(72) Inventor: Mikael Larsson, Trollhättan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 205 days.

(21) Appl. No.: 14/503,452

(22) Filed: Oct. 1, 2014

(65) Prior Publication Data

US 2016/0097443 A1 Apr. 7, 2016

(51) Int. Cl.
| | | |
|---|---|---|
| *F16H 48/34* | (2012.01) | |
| *F16H 48/06* | (2006.01) | |
| *F16H 63/34* | (2006.01) | |
| *F16H 48/08* | (2006.01) | |

(52) U.S. Cl.
CPC ............ *F16H 48/34* (2013.01); *F16H 48/06* (2013.01); *F16H 63/3416* (2013.01); *F16H 63/3425* (2013.01); *F16H 48/08* (2013.01)

(58) Field of Classification Search
CPC ............. F16H 63/3475; F16H 63/3441; F16H 2312/12; F16H 2048/346; F16H 2048/201; F16H 48/08; F16H 63/3416; F16D 11/10
See application file for complete search history.

(56) References Cited

U.S. PATENT DOCUMENTS

| | | | | |
|---|---|---|---|---|
| 3,550,738 | A | | 12/1970 | Halibrand |
| 3,915,267 | A | * | 10/1975 | Shea ................. B60B 35/12 180/217 |
| 4,369,867 | A | * | 1/1983 | Lemieux ............ B60T 1/005 188/31 |
| 4,497,398 | A | * | 2/1985 | Patel .............. F16D 25/046 188/366 |
| 4,895,233 | A | * | 1/1990 | Inoue ................. F16D 13/72 188/264 CC |
| 5,765,673 | A | * | 6/1998 | Nishiyama ........... F16D 13/52 188/71.5 |
| 6,536,751 | B2 | * | 3/2003 | Miyoshi ............. F16F 13/262 267/140.14 |
| 8,651,991 | B1 | * | 2/2014 | Sten .................. F16H 48/30 475/150 |
| 8,794,414 | B2 | * | 8/2014 | Culmer .............. F16D 65/186 188/264 D |

(Continued)

*Primary Examiner* — Stacey Fluhart
(74) *Attorney, Agent, or Firm* — Harness, Dickey & Pierce, P.L.C.

(57) ABSTRACT

A driveline component with a housing, a differential case in the housing that is rotatable about an axis, and a park lock mechanism with first, second and third lock elements. The first lock element is coupled to the differential case for common rotation about the axis and has a plurality of first face teeth. The second lock element is fixedly coupled to the housing and has a plurality of first radial teeth. The third lock element has an annular body, which is disposed about the axis, a plurality of second radial teeth, which are fixedly coupled to the annular body and matingly engaged to the first radial teeth, and a plurality of second face teeth that are fixedly coupled to the annular body. The third lock element is movable between first and second positions to selectively disengage and engage the first and second face teeth.

10 Claims, 1 Drawing Sheet

(56) References Cited

U.S. PATENT DOCUMENTS

| | | | |
|---|---|---|---|
| 9,222,565 B2 * | 12/2015 | Pichler | F16H 48/22 |
| 2004/0026139 A1 * | 2/2004 | Thomas | B60K 6/22 |
| | | | 180/65.245 |
| 2004/0204282 A1 * | 10/2004 | Green | B60K 17/16 |
| | | | 475/231 |
| 2008/0283354 A1 * | 11/2008 | Buannec | F16H 63/3416 |
| | | | 192/219.5 |
| 2014/0102251 A1 * | 4/2014 | Corsetti | B60K 6/48 |
| | | | 74/665 A |
| 2015/0292566 A1 * | 10/2015 | Konopka | F16D 13/10 |
| | | | 192/76 |

* cited by examiner

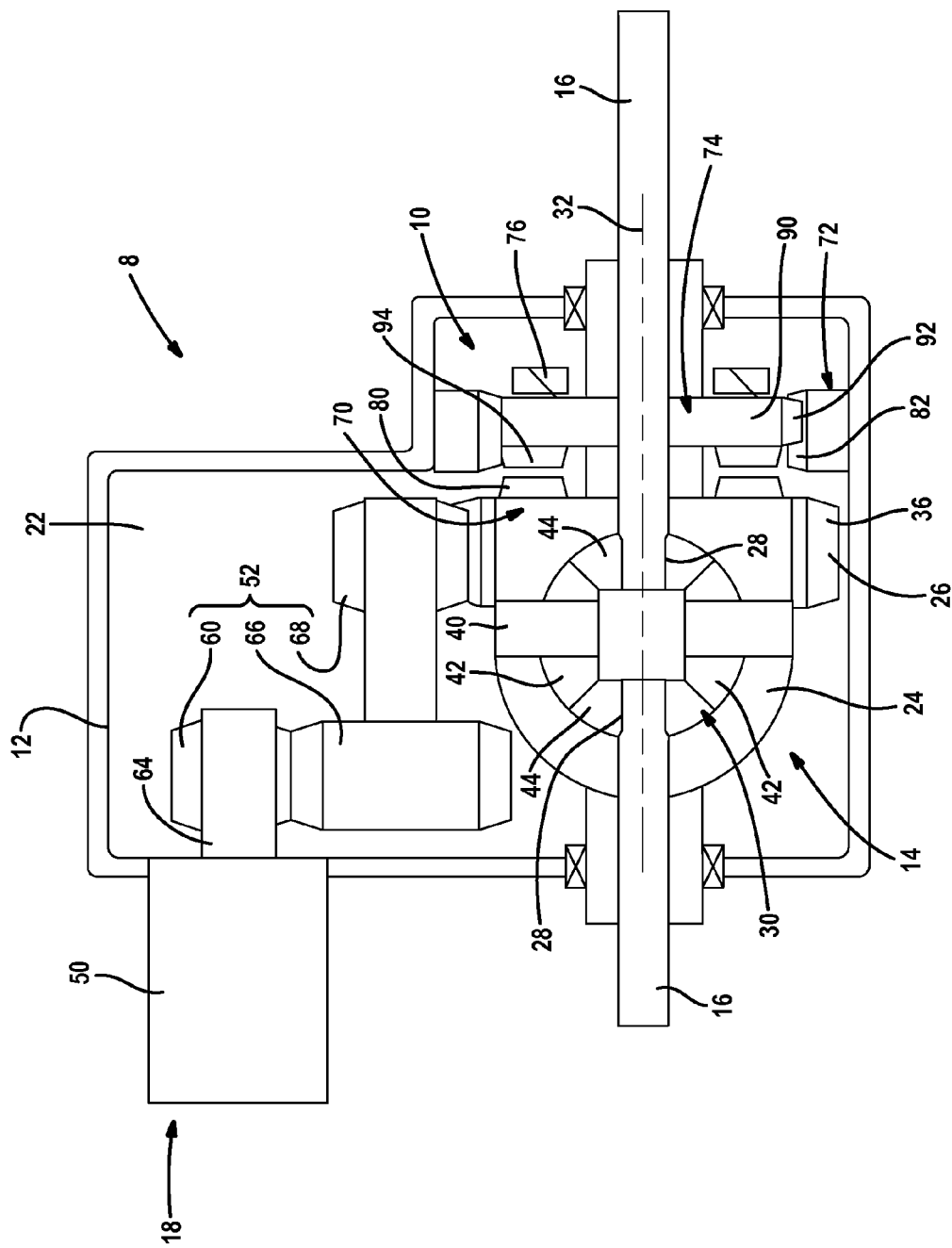

DRIVELINE COMPONENT HAVING DIFFERENTIAL AND PARK LOCK MECHANISM

FIELD

The present disclosure relates to a driveline component having a differential and a park lock mechanism.

BACKGROUND

This section provides background information related to the present disclosure which is not necessarily prior art.

Park lock mechanisms are commonly integrated into transmissions and vehicle driveline components and help to immobilize a vehicle when the vehicle is parked and not in use. Known park lock mechanism typically include a dog ring, which is coupled to a rotatable component of the driveline component for common rotation, and a pawl that is selectively engagable with the dog ring. While the known park lock mechanisms are suitable for their intended purpose, they nevertheless remain susceptible to improvement.

SUMMARY

This section provides a general summary of the disclosure, and is not a comprehensive disclosure of its full scope or all of its features.

In one form, the present teachings provide a driveline component that includes a housing that defines a cavity, a differential assembly disposed in the cavity, and a park lock mechanism. The differential assembly has a differential case that is rotatable about a differential axis. The park lock mechanism has a first lock element, a second lock element and a third lock element. The first lock element is coupled to the differential case for common rotation about the differential axis and has a plurality of first face teeth that are disposed circumferentially about the differential axis. The second lock element is fixedly coupled to the housing and has a plurality of first radial teeth that are disposed circumferentially about the differential axis. The third lock element has an annular body, a plurality of second radial teeth and a plurality of second face teeth. The annular body is disposed about the differential axis. The second face teeth is fixedly coupled to the annular body and disposed about the differential axis. The second radial teeth is fixedly coupled to the annular body and meshingly engaged with the first radial teeth such that the third lock element is movable between a first position, in which the second face teeth are spaced apart from the first face teeth, and a second position in which the second face teeth are engaged to the first face teeth to non-rotatably couple the differential case to the housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The only FIGURE is a cross-sectional view of an exemplary vehicle driveline component having a park lock mechanism that is constructed in accordance with the teachings of the present disclosure.

Corresponding reference numerals indicate corresponding parts throughout the several views of the drawings.

DETAILED DESCRIPTION

With reference to the only FIGURE of the drawings, an exemplary vehicle driveline component 8 is depicted as including a park lock mechanism 10 that is constructed in accordance with the teachings of the present disclosure. In the particular example provided, the vehicle driveline component 8 is an electric drive unit that is employed to provide power for propelling a vehicle. It will be appreciated, however, that the teachings of the present disclosure have application to various other types of vehicle driveline components, as well as to vehicle park lock mechanisms in general. As such, it will be understood that the scope of the disclosure is not to be limited by the particular example illustrated in the appended drawings and discussed in detail below.

The vehicle driveline component 8 can have a housing 12, a differential assembly 14, a pair of output shafts 16 and a drive mechanism 18. The housing 12 can define a cavity 22 into which the differential assembly 14 and the park lock mechanism 10 can be housed.

The differential assembly 14 can include a differential case 24, a differential input member 26, a pair of output members 28 and a means 30 for permitting speed differentiation between the output members 28. The differential case 24 can be received in the cavity 22 and supported for rotation about a differential axis 32 relative to the housing 12. The differential input member 26 can be coupled to the differential case 24 for common rotation and can be configured to receive rotary power from the drive mechanism 18. In the particular example provided, the differential input member 26 comprises a plurality of gear teeth 36 that are extend circumferentially about the differential case 24. The gear teeth 36 can be formed as a discrete structure (e.g., as a ring gear) and assembled to the differential case 24, or could be co-formed with the differential case 24. The output members 28 can be received in the differential case 24 and can be configured to transmit the rotary power that is output from the differential assembly 14 to the output shafts 16. The speed differentiation means 30 can be received in the differential case 24 and can comprise any desired structure, including gearsets and/or clutches. In the particular example provided, the speed differentiation means 30 comprises a differential gearset 32 having a cross-pin 40, a pair of differential pinions 42 and a pair of side gears 44. The cross-pin 40 is fixed to the differential case 24 for common rotation and extends in a direction that is perpendicular to the differential axis 32. The differential pinions 42 are bevel pinions that are rotatably mounted on the cross-pin 40. Each of the side gears 44 is rotatably disposed about the differential axis 32 and meshingly engaged with the differential pinions 42. Each of the side gears 44 is also fixedly coupled to an associated one of the differential output members 28 so that they co-rotate about the differential axis 32. In the particular example provided, each of the differential output members 28 comprises a female splined segment and is co-formed with a corresponding one of the side gears 44.

Each of the output shafts 16 can be fixedly coupled to an associated one of the differential output members 28 for common rotation. In the example provided, each of the output shafts 16 has a male splined segment that meshingly engages the female splined segment of an associated one of the differential output members 28.

The drive mechanism 18 can comprise a source of rotary power, such as an electric motor 50, and a transmission 52 that can transmit rotary power between the electric motor 50 and the differential input member 26. In the example provided, the transmission 52 comprises an input pinion 60, which is coupled to an output shaft 64 of the electric motor 50 for common rotation, an intermediate gear 66, which is meshingly engaged to the input pinion 60, and an output pinion 68 that is driven by the intermediate gear 66 and meshingly engaged to the gear teeth 36 of the differential input member 26.

The park lock mechanism 10 can comprise a first lock element 70, a second lock element 72, a third lock element 74 and a linear motor 76. The first lock element 70 can comprise a plurality of first face teeth 80 that can be fixedly coupled to the differential case 24. The first face teeth 80 can be disposed circumferentially about the differential axis 32 and can be co-formed with the differential case 24. The second lock element 72 can comprise a plurality of first radial teeth 82 that can be integrally formed with or fixedly coupled to the housing 12. The first radial teeth 82 of the second lock element 72 can be disposed circumferentially about the differential axis 32. The third lock element 74 can comprise an annular body 90, a plurality of second radial teeth 92 and a plurality of engagement teeth 94. The annular body 90 can be disposed about the differential case 24 such that one of the output shafts 16 and optional a portion of the differential case 24 can extend axially through the third lock element 74. The second radial teeth 92 can be coupled to or co-formed with the annular body 90 and can be engaged to the first radial teeth 80 of the second lock element 72 to permit the third lock element 74 to slide relative to the housing 12 along the differential axis 32 but prevent rotation of the third lock element 74 relative to the housing 12. The engagement teeth 94 can be disposed circumferentially about the differential axis 32 and fixedly coupled to an axial end of the annular body 90. The engagement teeth 94 are configured to selectively engage the first face teeth 80 of the first lock element 70. Those of skill in the art will appreciate from this disclosure that as the third lock element 74 is non-rotatably coupled to the housing 12 (via the second lock element 72), meshing engagement of the engagement teeth 94 with the first face teeth 80 will inhibit rotation of the differential case 24 relative to the housing 12.

The linear motor 76 can be any kind of device or mechanism for moving the third lock element 74 along the differential axis between a first position, in which the engagement teeth 94 are spaced apart from the first face teeth 80, and a second position in which the engagement teeth 94 are meshingly engaged with the first face teeth 80. In the particular example provided, the linear motor 76 comprises a latching two-position solenoid that can selectively hold the third lock element 74 in the first and second positions without requiring a constant current source. It will be appreciated, however, that the linear motor 76 can comprise other types of mechanisms and devices and that it need not be electrically powered.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A driveline component comprising:
a housing defining a cavity;
a differential assembly disposed in the cavity, the differential assembly having a differential case that is rotatable about a differential axis; and
a park lock mechanism having a first lock element, a second lock element and a third lock element, the first lock element being coupled to the differential case for common rotation about the differential axis, the first lock element having a plurality of first face teeth that are disposed circumferentially about the differential axis, the second lock element being fixedly coupled to the housing and having a plurality of first radial teeth that are disposed circumferentially about the differential axis and face radially inward toward the differential axis, the third lock element having an annular body, a plurality of second radial teeth and a plurality of second face teeth, the annular body being disposed about the differential axis, the second face teeth being fixedly coupled to the annular body and disposed about the differential axis, the second radial teeth being fixedly coupled to the annular body and facing radially outward from the annular body to be meshingly engaged with the first radial teeth such that the third lock element is axially movable between a first position, in which the second face teeth are spaced apart from the first face teeth, and a second position in which the second face teeth are engaged to the first face teeth to non-rotatably couple the differential case to the housing.

2. The driveline component of claim 1, wherein the park lock mechanism further comprises a linear motor that is configured to move the third lock element between the first and second positions.

3. The driveline component of claim 2, wherein the linear motor comprises a latching two-position solenoid.

4. The driveline component of claim 1, further comprising a drive mechanism that is selectively operable for supplying rotary power to the differential assembly.

5. The driveline component of claim 4, wherein the drive mechanism comprises an electric motor and a transmission that transmits rotary power between the electric motor and the differential assembly.

6. The driveline component of claim 4, wherein the differential assembly comprises a differential input member having a plurality of gear teeth that meshingly engage an output member of the drive mechanism.

7. The driveline component of claim 1, wherein the differential assembly comprises a differential gearset.

8. The driveline component of claim 1, further comprising a pair of output shafts, wherein the differential assembly has a pair of differential outputs and wherein each of the output shafts is driven by an associated one of the differential outputs.

9. The driveline component of claim 8, wherein one of the output shafts extends axially through the third lock element.

10. The driveline component of claim 1, wherein a portion of the differential case extends through the third lock element.

* * * * *